United States Patent
Sasaki et al.

(10) Patent No.: US 10,877,155 B2
(45) Date of Patent: Dec. 29, 2020

(54) SURVEY DATA PROCESSING DEVICE, SURVEY DATA PROCESSING METHOD, AND SURVEY DATA PROCESSING PROGRAM

(71) Applicant: TOPCON CORPORATION, Tokyo (JP)

(72) Inventors: Daisuke Sasaki, Itabashi-ku (JP); Takahiro Komeichi, Itabashi-ku (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 16/574,110

(22) Filed: Sep. 18, 2019

(65) Prior Publication Data

US 2020/0096641 A1 Mar. 26, 2020

(30) Foreign Application Priority Data

Sep. 25, 2018 (JP) .................................. 2018-178656

(51) Int. Cl.
  *G01S 17/89* (2020.01)
  *G01S 17/42* (2006.01)
  *G06T 17/00* (2006.01)

(52) U.S. Cl.
  CPC .............. *G01S 17/89* (2013.01); *G01S 17/42* (2013.01); *G06T 17/00* (2013.01); *G06T 2210/56* (2013.01)

(58) Field of Classification Search
  CPC .................. G06T 17/00; G06T 2207/10028
  See application file for complete search history.

(56) References Cited

U.S. PATENT DOCUMENTS

| 7,726,033 B2 | 6/2010 | Ohtomo et al. |
| 8,310,653 B2 | 11/2012 | Ogawa et al. |
| 8,355,118 B2 | 1/2013 | Ogawa et al. |

(Continued)

FOREIGN PATENT DOCUMENTS

| EP | 1 903 303 A2 | 3/2008 |
| EP | 3 333 538 A1 | 6/2018 |

(Continued)

OTHER PUBLICATIONS

Extended European Search Report dated Feb. 14, 2020 in European Application No. 19198957.3-1001.

*Primary Examiner* — Phi Hoang (74) *Attorney, Agent, or Firm* — Xsensus LLP (57) ABSTRACT

A survey data processing device includes a panoramic image data receiving unit, a point cloud data receiving unit, a similar part designation receiving unit, and a correspondence relationship determining unit. The panoramic image data receiving unit receives first and second panoramic images that are respectively obtained at a first point of view and a second point of view. The point cloud data receiving unit receives first point cloud data that is obtained by a first laser scanner and receives second point cloud data that is obtained by a second laser scanner. The similar part designation receiving unit receives designation of a part that is the same or similar between the first and second panoramic images. The correspondence relationship determining unit determines a correspondence relationship between the first and second point cloud data on the basis of the first and second point cloud data corresponding to the same or similar part.

9 Claims, 9 Drawing Sheets

(56) References Cited

U.S. PATENT DOCUMENTS

| | | | |
|---|---|---|---|
| 9,659,378 B2 | 5/2017 | Sasaki et al. | |
| 2008/0075326 A1* | 3/2008 | Otani | G01C 11/06 |
| | | | 382/106 |
| 2009/0241358 A1 | 10/2009 | Ohtomo et al. | |
| 2010/0256940 A1 | 10/2010 | Ogawa et al. | |
| 2012/0218546 A1 | 8/2012 | Ogawa et al. | |
| 2014/0253689 A1* | 9/2014 | Kumagai | H04N 13/275 |
| | | | 348/46 |
| 2015/0042645 A1 | 2/2015 | Kawaguchi et al. | |
| 2016/0063717 A1 | 3/2016 | Sasaki et al. | |
| 2018/0158200 A1* | 6/2018 | Metzler | G06T 7/38 |
| 2019/0335160 A1* | 10/2019 | Ramadneh | G01S 7/481 |

FOREIGN PATENT DOCUMENTS

| | | |
|---|---|---|
| JP | 2008-268004 A | 11/2008 |
| JP | 2010-151682 A | 7/2010 |
| JP | 2013-178656 A | 9/2013 |
| JP | 2013-186816 A | 9/2013 |
| JP | 6184237 B2 | 8/2017 |

* cited by examiner

Panoramically displayed reflection intensity images

Panoramic images

Fig. 11

Panoramically displayed distance images

Panoramic images

Fig. 12

Panoramically displayed normal vector images

Panoramic images

SURVEY DATA PROCESSING DEVICE, SURVEY DATA PROCESSING METHOD, AND SURVEY DATA PROCESSING PROGRAM

CROSS-REFERENCE TO RELATED APPLICATION

The present application claims priority to JP 2018-178656, filed Sep. 25, 2018, the entire contents of which are incorporated herein by reference.

BACKGROUND OF THE INVENTION

Technical Field

The present invention relates to a technique for processing information that is obtained by using a laser scanner.

Background Art

Laser scanners that perform laser scanning using laser light to obtain point cloud data are publicly known. Such a laser scanner is disclosed in Japanese Patent No. 6184237, for example. The laser light for measurement does not reach areas hidden from the laser scanner, and thus, it is difficult to obtain point cloud data of such areas. This phenomenon is called "occlusion". To cope with this problem, laser scanning may be performed at two or more different instrument points to obtain two or more pieces of point cloud data as viewed from the two or more different instrument points, and these pieces of the point cloud data are merged to obtain point cloud data with little or no occlusion.

To merge multiple pieces of point cloud data that are obtained at different instrument points, it is necessary to obtain a correspondence relationship between the multiple pieces of the point cloud data. In a condition in which exterior orientation parameters (position and attitude) of the laser scanner at each of the instrument points are obtained, the multiple pieces of the point cloud data can be used in a common coordinate system, and the merging of the multiple pieces of the point cloud data is easy. However, this method requires an operation to obtain the exterior orientation parameters of the laser scanner at each of the instrument points and is therefore not convenient.

The multiple pieces of the point cloud data may be matched by matching shapes of the point clouds to determine correspondence relationships. However, this method is performed by software processing that can cause an increase in unnecessary calculations and low accuracy unless a certain level of approximate matching is performed in advance. For this reason, normally, corresponding points are designated manually by an operator, and then, precise matching is performed by software processing.

SUMMARY OF THE INVENTION

A method of manually designating corresponding points between two pieces of point cloud data has low work efficiency in finding the corresponding points. Thus, a more convenient method is desired. In view of these circumstances, an object of the present invention is to provide a technique that enables easy determination of a correspondence relationship between multiple pieces of point cloud data that are obtained at multiple instrument points by using a laser scanner.

The present invention provides a survey data processing device including a processor or circuitry. The processor or circuitry is configured to receive image data of a first panoramic image obtained at a first point of view and image data of a second panoramic image obtained at a second point of view. The processor or circuitry is further configured to receive first point cloud data and second point cloud data. The first point cloud data is obtained by a first laser scanner, in which a positional relationship and an attitude relationship relative to a first device for obtaining the first panoramic image are known. The second point cloud data is obtained by a second laser scanner in which a positional relationship and an attitude relationship relative to a second device for obtaining the second panoramic image are known. The processor or circuitry is further configured to receive designation of the same or a similar part that is the same or similar between the first panoramic image and the second panoramic image. The processor or circuitry is further configured to determine a correspondence relationship between the first point cloud data and the second point cloud data on the basis of the first point cloud data corresponding to the same or similar part and the second point cloud data corresponding to the same or similar part.

In one aspect of the present invention, at least two points may be designated as the same or similar parts. In one aspect of the present invention, at least one point may be designated as the same or a similar part, and the correspondence relationship between the first point cloud data and the second point cloud data may be determined on the basis of coordinates of the at least one point of the first point cloud data, coordinates of the at least one point of the second point cloud data, direction of the first device at the time of obtaining the first panoramic image, and direction of the second device at the time of obtaining the second panoramic image.

In one aspect of the present invention, the direction of the first device may be an azimuth in a horizontal direction of the first device, and the direction of the second device may be an azimuth in a horizontal direction of the second device. In one aspect of the present invention, the processor or circuitry may also be configured to, in a case in which a specific part is designated in the first panoramic image, display an assisting indication showing a horizontal angle position at the specific part in the second panoramic image, on the basis of the azimuth in the horizontal direction of the first device at the time of obtaining the first panoramic image and the azimuth in the horizontal direction of the second device at the time of obtaining the second panoramic image.

In one aspect of the present invention, the assisting indication may show an angle of a horizontal azimuth. In one aspect of the present invention, horizontal azimuths of the first panoramic image and the second panoramic image may be aligned to display the assisting indication. In one aspect of the present invention, the same or similar part may be a line segment or a plane.

In one aspect of the present invention, the processor or circuitry may also be configured to generate a first three-dimensional model based on the first point cloud data and a second three-dimensional model based on the second point cloud data, extract a second line that constitutes the second three-dimensional model and that corresponds to a first line constituting the first three-dimensional model, and highlight the first line and the second line. In one aspect of the present invention, the processor or circuitry may also be configured to generate a first three-dimensional model based on the first point cloud data and a second three-dimensional model based on the second point cloud data, extract a second plane that constitutes the second three-dimensional model and that corresponds to a first plane constituting the first three-dimensional model, and highlight the first plane and the second plane.

The present invention also provides a survey data processing method including receiving image data of a first panoramic image obtained at a first point of view and image data of a second panoramic image obtained at a second point of view. The method also includes receiving first point cloud data and second point cloud data. The first point cloud data is obtained by a first laser scanner in which a positional relationship and an attitude relationship relative to a first device for obtaining the first panoramic image are known. The second point cloud data is obtained by a second laser scanner in which a positional relationship and an attitude relationship relative to a second device for obtaining the second panoramic image are known. The method also includes receiving designation of the same or a similar part that is the same or similar between the first panoramic image and the second panoramic image and determining a correspondence relationship between the first point cloud data and the second point cloud data on the basis of the first point cloud data corresponding to the same or similar part and the second point cloud data corresponding to the same or similar part.

The present invention further provides a non-transitory computer recording medium storing computer executable instructions for processing surveying data. The computer executable instructions are made to, when executed by a computer processor, cause the computer processor to receive image data of a first panoramic image obtained at a first point of view and image data of a second panoramic image obtained at a second point of view. The computer executable instructions are made to, when executed by a computer processor, also cause the computer processor to receive first point cloud data and second point cloud data. The first point cloud data is obtained by a first laser scanner in which a positional relationship and an attitude relationship relative to a first device for obtaining the first panoramic image are known. The second point cloud data is obtained by a second laser scanner in which a positional relationship and an attitude relationship relative to a second device for obtaining the second panoramic image are known. The computer executable instructions are made to, when executed by a computer processor, also cause the computer processor to receive designation of the same or a similar part that is the same or similar between the first panoramic image and the second panoramic image, and to determine a correspondence relationship between the first point cloud data and the second point cloud data on the basis of the first point cloud data corresponding to the same or similar part and the second point cloud data corresponding to the same or similar part.

The present invention provides a technique that enables easy determination of a correspondence relationship between multiple pieces of point cloud data that are obtained at multiple instrument points by laser scanner.

PREFERRED EMBODIMENTS OF THE INVENTION

Overview

Figure 1:
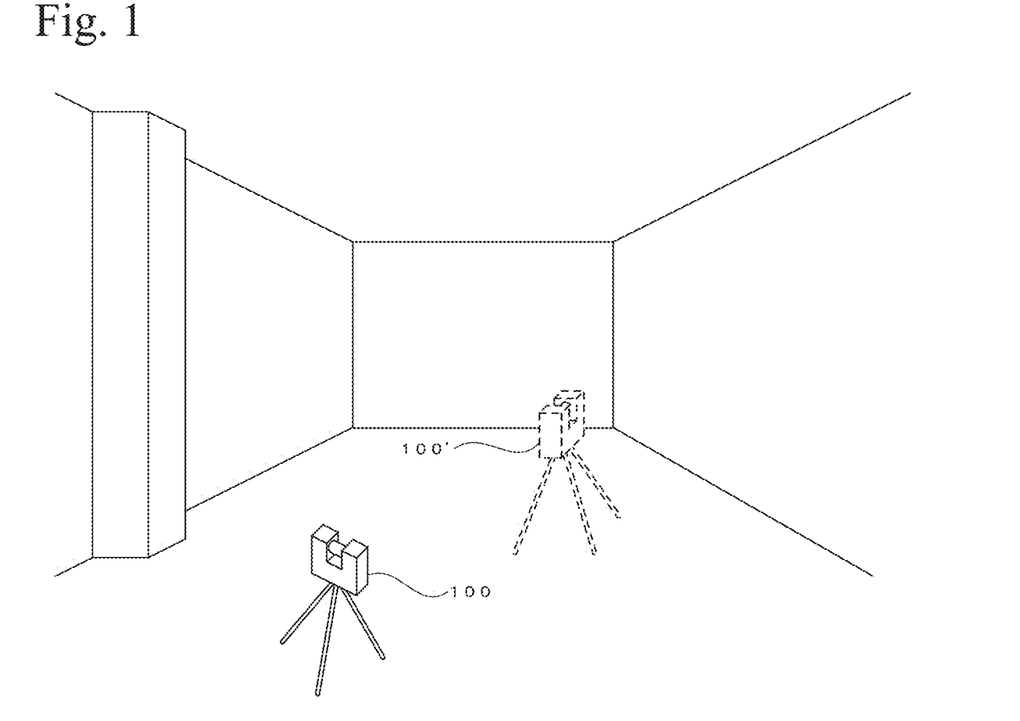
FIG. 1 is a conceptual diagram of an embodiment.

FIG. 1 shows a situation in which an interior of a room is laser-scanned from two instrument points. In this situation, one laser scanner is used to perform laser scanning at a first instrument point and then perform second laser scanning at a second instrument point. In the case of FIG. 1, a laser scanner that is placed at a first instrument point is denoted by reference symbol 100, and a laser scanner that is placed at a second instrument point is denoted by reference symbol 100'. The laser scanner 100 and the laser scanner 100' are embodied by the same device. Of course, it is possible to use two laser scanners. In addition, three or more instrument points may be chosen. The instrument point is a position of an optical origin of a laser scanner and serves as a point of view for laser scanning Point cloud data is obtained by using the instrument point as the origin.

It is assumed that the laser scanners 100 and 100' are placed so as to be horizontal and that the exact locations of the laser scanners 100 and 100' are not known. However, the azimuth of the laser scanner 100 is measured by an azimuth meter and is already known. The azimuth is a direction of the laser scanner in a horizontal plane. For example, the azimuth is defined by an angle that is measured in the clockwise direction from 0 degrees north as viewed from above. In this example, west is an azimuth of 90 degrees.

Laser Scanner

Figure 2:
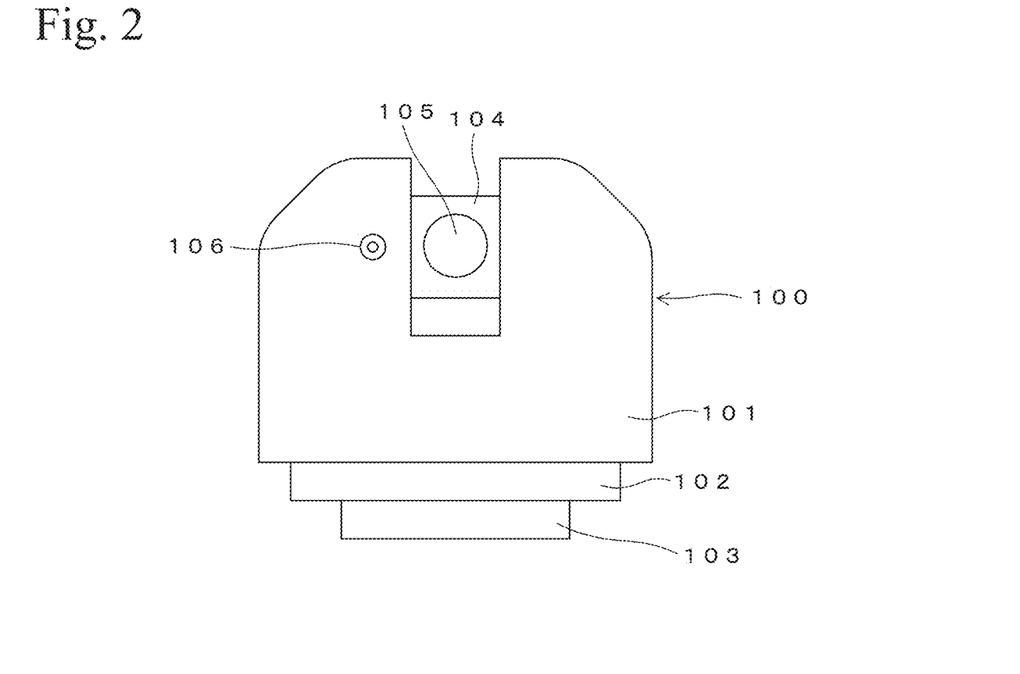
FIG. 2 is a front view of a laser scanner.

FIG. 2 shows the laser scanner 100. The laser scanner 100 obtains point cloud data. The point cloud data is obtained by sporadically emitting laser light to an object and calculating three-dimensional coordinates of each of points reflecting the laser light on the basis of laser positioning principles. The point cloud data provides three-dimensional measurement data of the object as a set of a large number of points in which three-dimensional coordinates are obtained. Details of the laser scanner are disclosed in Japanese Unexamined Patent Applications Laid-Open Nos. 2010-151682 and 2008-268004, for example.

The laser scanner 100 has a horizontally rotating unit 101 that serves as a body, a base 102 that supports the horizontally rotating unit 101 in a horizontally rotatable manner, and a table 103 on which the base 102 is mounted. The horizontally rotating unit 101 is horizontally rotatable relative to the base 102 by electric operation. The table 103 has an adjusting mechanism that adjusts a horizontal condition of the horizontally rotating unit 101. The horizontally rotating unit 101 has a level (not shown) that is mounted thereon for checking the horizontal condition. The table 103 may be fixed on top of a tripod or another tool.

Figure 3:
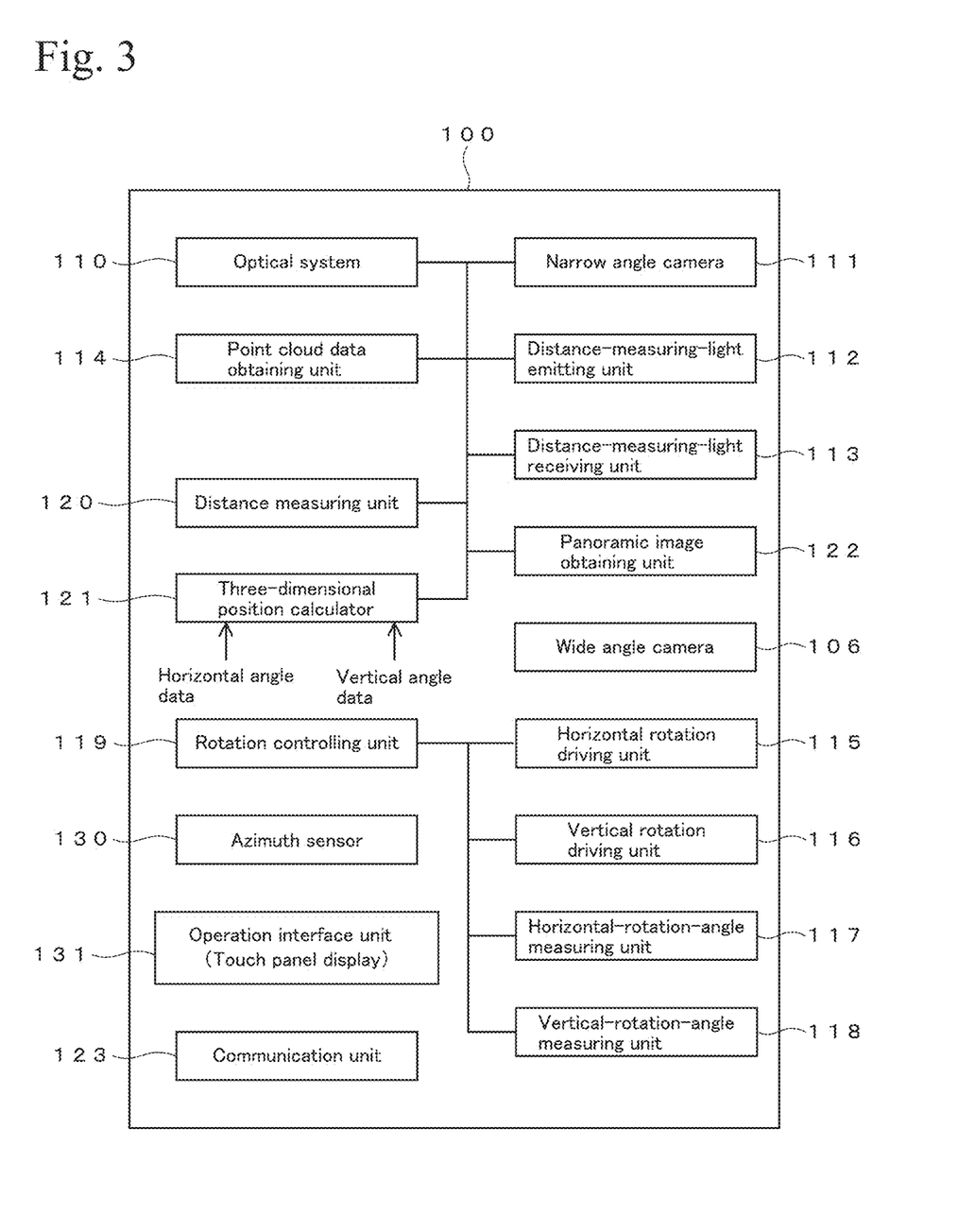
FIG. 3 is a block diagram of the laser scanner.

The horizontally rotating unit 101 has an approximately U-shape and has a vertically rotating unit 104 that is disposed between a pair of extending parts. The pair of the extending parts has a double-headed body extending upwardly to form the approximate U-shape. The vertically rotating unit 104 vertically rotates around a horizontal axis by electric operation. The vertically rotating unit 104 includes an objective lens 105. The horizontally rotating unit 101 contains a narrow angle camera 111, which is shown in FIG. 3. The objective lens 105 is shared by distance measuring light for obtaining point cloud data and the narrow angle camera 111. The distance measuring light is laser light for distance measurement. The vertically rotating unit 104 contains a part of an optical system 110 for the distance measuring light and for the narrow angle camera 111. The horizontally rotating unit 101 has a wide angle camera 106 that is mounted thereon.

The angle of view of the narrow angle camera 111 is approximately 9 to 12 degrees in each of a horizontal angle and a vertical angle, whereas the angle of view of the wide angle camera 106 is approximately 170 degrees in each of the horizontal angle and the vertical angle. The vertical angle includes upper and lower angles. Positional relationships and attitude relationships, that is, relationships of exterior orientation parameters, between the narrow angle camera 111, the wide angle camera 106, and the laser scanner 100, are preliminarily obtained and are known.

While the horizontally rotating unit 101 is made to horizontally rotate, and the vertically rotating unit 104 is made to vertically rotate, pulse irradiation of scanning laser light, which is laser light for distance measurement, is performed at a frequency of several tens to several hundreds of kHz. Thus, laser scanning is performed, and point cloud data is obtained.

The horizontally rotating unit 101 also has a touch panel display (not shown) that is mounted thereon. The touch panel display is used for displaying various pieces of information and for operation.

FIG. 3 shows a functional block diagram of the laser scanner 100. The laser scanner 100 includes the optical system 110. A part of the optical system 110 is disposed inward of the objective lens 105. The optical system 110 separates a light path of the narrow angle camera 111 and a light path of the distance measuring light, and also separates a light emitting system and a light receiving system of the distance measuring light.

The distance measuring light is emitted from a distance-measuring-light emitting unit 112 to the outside via the optical system 110 and the objective lens 105. The distance measuring light is reflected back from an object from which point cloud data is to be obtained, and the reflected distance measuring light enters the objective lens 105 and is received by a distance-measuring-light receiving unit 113 via the optical system 110.

A reference light path (not shown) is provided inside the horizontally rotating unit 101. The pulsed light from the distance-measuring-light emitting unit 112 is divided, and one of the divided beams of pulsed light is emitted to the object as distance measuring light, whereas the other is led to the reference light path as reference light. The distance measuring light that is captured by the objective lens 105 and the reference light that propagates the reference light path are combined by the optical system 110 and are detected by the distance-measuring-light receiving unit 113. At this time, the distance measuring light and the reference light have a light path difference, and thus, output waveforms from the distance-measuring-light receiving unit 113 have a phase difference. On the basis of the phase difference, a distance to a reflection point that reflects the distance measuring light is calculated. This calculation is performed by a distance measuring unit 120.

The value of the distance to the reflection point, and a horizontal angle of the horizontally rotating unit 101 and a vertical angle of the vertically rotating unit 104 at the time of measuring the distance, are used to calculate a three-dimensional position of the reflection point that reflects the distance measuring light. The three-dimensional position has the optical origin or the instrument point of the laser scanner 100, as the origin. The coordinates of the reflection point serve as coordinates of points. This process is performed by a three-dimensional position calculator 121. The reflection point is a scanned point, and a set of coordinate values of scanned points composes point cloud data. The point cloud data is obtained by a point cloud data obtaining unit 114.

A panoramic image obtaining unit 122 obtains a panoramic image of the surroundings of the laser scanner 100. The panoramic image can be obtained by using the narrow angle camera 111 or the wide angle camera 106. In the case of using the narrow angle camera 111 to obtain a panoramic image, multiple single photographed images are combined to obtain a panoramic image. In the case of using the wide angle camera 106, a panoramic image of a wide angle area is obtained by photographing once.

A rotation controlling unit 119 controls horizontal rotation of the horizontally rotating unit 101 and vertical rotation of the vertically rotating unit 104. The horizontally rotating unit 101 is rotated by a horizontal rotation driving unit 115 that includes components such as a motor, a driving circuit for the motor, and a gear. The vertically rotating unit 104 is rotated by a vertical rotation driving unit 116 that includes components such as a motor, a driving circuit for the motor, and a gear.

The horizontal angle of the horizontally rotating unit 101 is measured by a horizontal-rotation-angle measuring unit 117 that includes an angle measuring sensor, such as a rotary encoder, and a peripheral circuit of the angle measuring sensor. The vertical angle of the vertically rotating unit 104 is measured by a vertical-rotation-angle measuring unit 118 that includes an angle measuring sensor, such as a rotary encoder, and a peripheral circuit of the angle measuring sensor.

The azimuth sensor 130 measures an azimuth of the laser scanner 100. Examples of the azimuth sensor 130 include a magnetic sensor and a combination of a magnetic sensor and a gyroscope sensor. Alternatively, a convenient method using an azimuth sensor built in a smartphone may be employed. In this case, an attachment for fixing the smartphone is mounted to the horizontally rotating unit 101, and the smartphone is affixed thereto to be used as an azimuth sensor.

The operation interface unit 131, which is embodied by a touch panel display, receives an operation content for the laser scanner 100 and provides various pieces of information to a user. A communication unit 123 communicates with a survey data processing device 300 and other apparatuses. The survey data processing device 300 is described later. In this embodiment, the image data of the panoramic image and the point cloud data are transmitted via the communication unit 123 from the laser scanner 100 to the survey data processing device 300.

Survey Data Processing Device

Figure 4:
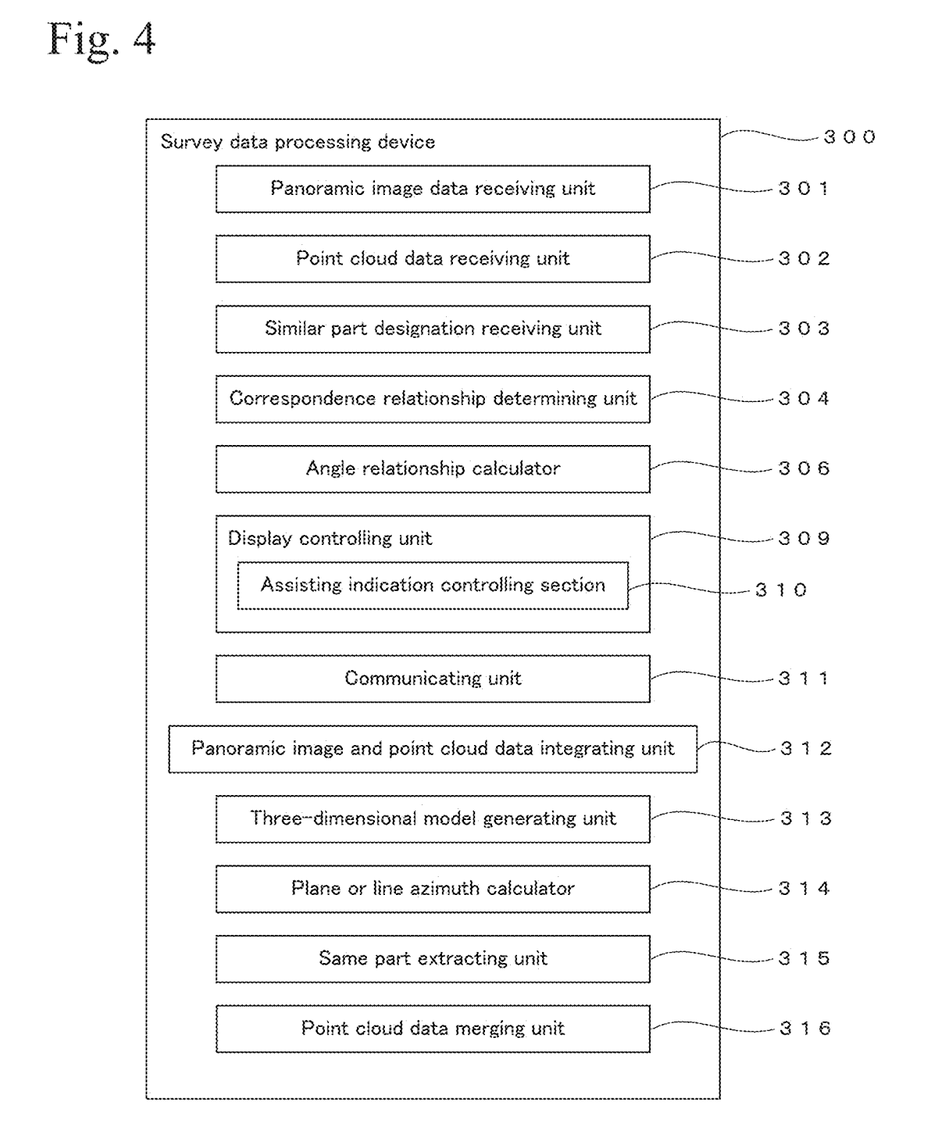
FIG. 4 is a block diagram of a survey data processing device.

FIG. 4 shows the survey data processing device 300. The survey data processing device 300 is a computer that exhibits functions of functional units shown in the drawing. The survey data processing device 300 is constructed of electronic circuits constituting a CPU, a memory, and an interface for implementing the functions of the functional units shown in the drawing. The survey data processing device 300 may be embodied by using a general-purpose computer or a piece of dedicated hardware. For example, programs for implementing the functions of the functional units shown in FIG. 3 may be installed in a computer, such as a tablet, a smart phone, or a laptop computer, and this computer may be used as the survey data processing device 300. In another example, the survey data processing device 300 may be incorporated inside the laser scanner 100.

The survey data processing device 300 includes a panoramic image data receiving unit 301, a point cloud data receiving unit 302, a similar part designation receiving unit 303, a correspondence relationship determining unit 304, an angle relationship calculator 306, a display controlling unit 309, a communicating unit 311, a panoramic image-and-point cloud data integrating unit 312, a three-dimensional model generating unit 313, a plane or line azimuth calculator 314, a same part extracting unit 315, and a point cloud data merging unit 316.

The panoramic image data receiving unit 301 receives data of a panoramic image that is based on a photographed image taken by a camera of the laser scanner 100. The panoramic image may be a photographed image taken by the wide angle camera 106 having a function of obtaining a panoramic image or may be obtained by stitching together multiple single photographed images taken by the narrow angle camera 111. The panoramic image can also be obtained by generating it inside the survey data processing device 300. In this case, a panoramic image generating unit is provided to the survey data processing device 300, and a panoramic image is generated by the panoramic image generating unit and is used.

The point cloud data receiving unit 302 receives point cloud data obtained by the laser scanner 100. It is also possible to use point cloud data that is obtained from a stereoscopic photographed image. The technique for obtaining point cloud data from a stereoscopic photographed image is disclosed in, for example, Japanese Unexamined Patent Applications Laid-Open Nos. 2013-186816 and 2013-178656.

The similar part designation receiving unit 303 receives designation of a part that is the same or similar between two panoramic images that are obtained at different points of view or different instrument points. The same or similar part is designated manually by an operator. In this embodiment, a first panoramic image and a second panoramic image are separately displayed on a display such as of a PC constituting the survey data processing device 300, and the same or a similar part is designated on the displayed images. The separately displayed panoramic images include, in addition to ordinary panoramic images, panoramically displayed point cloud images, panoramically displayed reflection intensity images, panoramically displayed distance images, and panoramically displayed normal vector images.

The correspondence relationship determining unit 304 determines, on the basis of the designated part that is the same or similar between the two panoramic images, a correspondence relationship between pieces of point cloud data corresponding to the respective panoramic images. For example, two pieces of point cloud data that are obtained in the situation in FIG. 1 are obtained through laser scanning performed at different points of view or different instrument points. Exterior orientation parameters (position and attitude) of the laser scanner 100 at each of the instrument points at the time of the laser scanning are unknown. The attitude can be obtained from a measurement value from the azimuth sensor 130, but this value has low accuracy and does not have an accuracy sufficient for use in point cloud data matching. Thus, the correspondence relationship between the two pieces of the point cloud data is unknown. The correspondence relationship may be obtained by each type of matching technique, such as template matching; however, the burden of processing is heavy unless matching is approximately performed to narrow down initial conditions to some extent, and furthermore, the matching error is large.

The designation of the part corresponding between two pieces of point cloud data enables matching or determination of a correspondence relationship between the two pieces of the point cloud data at an acceptable degree of accuracy. The matching between two pieces of point cloud data results in merging of the two pieces of the point cloud data, thereby making it possible to use the two pieces of the point cloud data in the same coordinate system. The process relating to determination of the correspondence relationship is performed by the correspondence relationship determining unit 304. There are two methods, as described below, for this process.

Figure 5A:
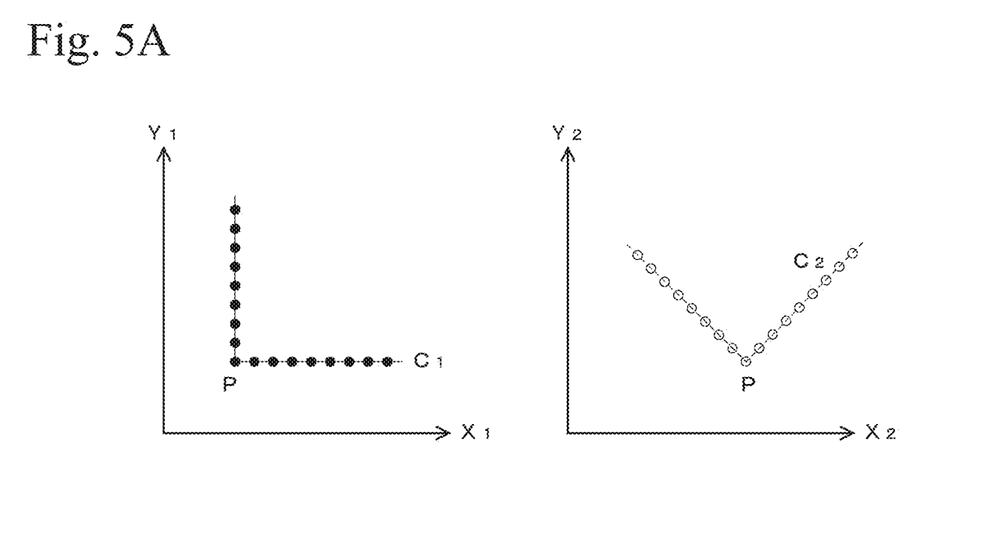
FIGS. 5A and 5B are principle diagrams for explaining merging of pieces of point cloud data.
Figure 5B:
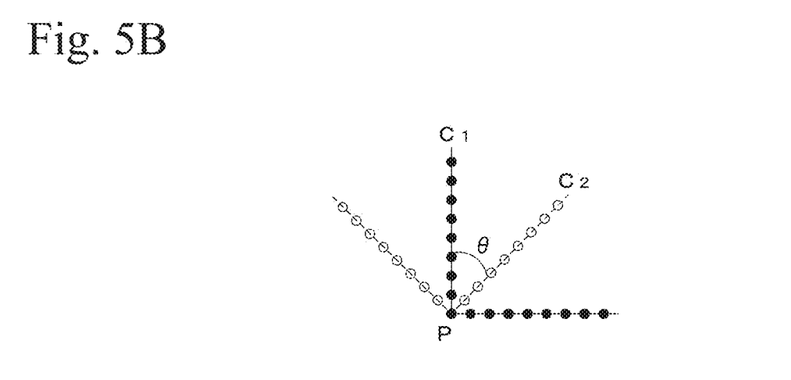

The first method uses one common point and an azimuth of a laser scanner at each instrument point. FIGS. 5A and 5B show a principle for matching two pieces of point cloud data with the use of one common point and an azimuth of a laser scanner at each instrument point. FIG. 5A shows first point cloud data $C_1$ and second point cloud data $C_2$ in a horizontal plane. The point cloud data $C_1$ corresponds to point cloud data obtained by the laser scanner 100 in FIG. 1, and the point cloud data $C_2$ corresponds to point cloud data obtained by the laser scanner 100' in FIG. 1.

Immediately after the point cloud data $C_1$ and $C_2$ are obtained, exterior orientation parameters of the laser scanners 100 and 100' at respective instrument points are not known, and thus, the relationship between the point cloud data $C_1$ and $C_2$ is not known, and the relationship between coordinate systems $X_1$-$Y_1$ and $X_2$-$Y_2$ is also not known. On the other hand, the horizontal positions of the laser scanners 100 and 100' at the time of laser scanning are accurately determined. Thus, unknown factors are the relationship of a horizontal angle between the point cloud data $C_1$ and $C_2$ and the relationship of coordinates in the plane between the point cloud data $C_1$ and $C_2$.

Under these conditions, it is assumed that a point P that is common between the two pieces of the point cloud data is designated. A three-dimensional coordinate system $(X_1, Y_1, Z_1)$ of the coordinate system $X_1$-$Y_1$ of the point P and a three-dimensional coordinate system $(X_2, Y_2, Z_2)$ of the coordinate system $X_2$-$Y_2$ of the point P are known from the point cloud data $C_1$ and $C_2$, that is, $(X_1, Y_1, Z_1)=(X_2, Y_2, Z_2)$, whereby the correspondence relationship between the two pieces of the point cloud data at the point P is determined.

The coordinates of the point P in each coordinate system are obtained as follows. First, the position of the point P in each of the panoramic images is received by the similar part designation receiving unit 303. This designation is manually performed by an operator who operates the survey data processing device 300. The designation of the point P in each of the panoramic images provides screen coordinate values of the point P in each of the panoramic images, which are coordinates of the position in the image on a display. The panoramic image-and-point cloud data integrating unit 312 provides a relationship between each point of the point cloud data $C_1$ and a screen coordinate position in the corresponding panoramic image that is obtained at the point of view for the point cloud data $C_1$. Thus, designation of the point P in the panoramic image corresponding to the point cloud data $C_1$ enables obtaining three-dimensional coordinate values of the point P from the point cloud data $C_1$.

There may be a case of having no point in the point cloud data corresponding to a specific point in the panoramic image due to an interval between points of the point cloud data. In such a case, a point in the point cloud data closest to the designated position is obtained as a corresponding point.

FIG. 5B shows a state in which one point common between the point cloud data $C_1$ and $C_2$ is determined. At this stage, the relationship of direction in the horizontal plane between the two pieces of the point cloud data is unknown, and thus, correspondence relationships other than the correspondence relationship of the point P are also unknown. In these conditions, a correspondence relationship between the point cloud data $C_1$ and $C_2$ is determined by obtaining a horizontal angle relationship between the point cloud data $C_1$ and $C_2$. That is, the correspondence relationship between the point cloud data $C_1$ and $C_2$ is determined by obtaining an angle θ in FIG. 5B. The angle θ shows a directional relationship between the coordinate systems $X_1$-$Y_1$ and $X_2$-$Y_2$. In this case, rotating the coordinate system $X_1$-$Y_1$ around the point P by the angle θ makes the coordinate systems $X_1$-$Y_1$ and $X_2$-$Y_2$ agree with each other.

The angle θ is a difference in the horizontal angle between the laser scanners 100 and 100'. The difference θ in the horizontal angle is obtained from measurement values of the azimuth sensor 130 of the laser scanners 100 and 100'.

Thus, designating one point that is common between the panoramic image corresponding to the point cloud data $C_1$ and the panoramic image corresponding to the point cloud data $C_2$ and obtaining the difference θ in the horizontal angle between at the instrument points from the azimuth sensor 130 enable matching the point cloud data $C_1$ and $C_2$ or determining the correspondence relationship between the point cloud data $C_1$ and $C_2$. Due to designation of the point not being strict and to not very high accuracy of the azimuth sensor 130, this matching is approximate. In some cases, multiple common points may be designated.

The above is the first method for determining the correspondence relationship between the first point cloud data corresponding to the first panoramic image and the second point cloud data corresponding to the second panoramic image. Next, a second method is described. In this method, two different points that are common between two panoramic images are designated to obtain a correspondence relationship between two pieces of point cloud data corresponding to the two panoramic images.

This method involves designating another common point in addition to the point P in the situation in FIG. 5B to match the point cloud data $C_1$ and $C_2$ or determine the correspondence relationship between the point cloud data $C_1$ and $C_2$.

In application of this method, a part of a line segment or a part of a plane may be designated as the same or a similar part. In the case of using a line segment, points distributed linearly are used. In the case of using a plane, points distributed in a plane are used.

The angle relationship calculator 306 calculates a relationship of the azimuth between the laser scanner 100 at the first instrument point and the laser scanner 100' at the second instrument point. For example, assuming that the azimuth of the laser scanner 100 at the first instrument point at the start of laser scanning is 0 degrees, whereas the laser scanner 100' at the second instrument point at the start of laser scanning is 30 degrees, the difference in the azimuth between the laser scanners 100 and 100' is 30 degrees. This calculation is performed by the angle relationship calculator 306.

The display controlling unit 309 controls displaying of a panoramic image and other images on a display. The display controlling unit 309 includes an assisting indication controlling section 310. The assisting indication controlling section 310 controls displaying to facilitate visual understanding of the first panoramic image and the second panoramic image.

Figure 6:
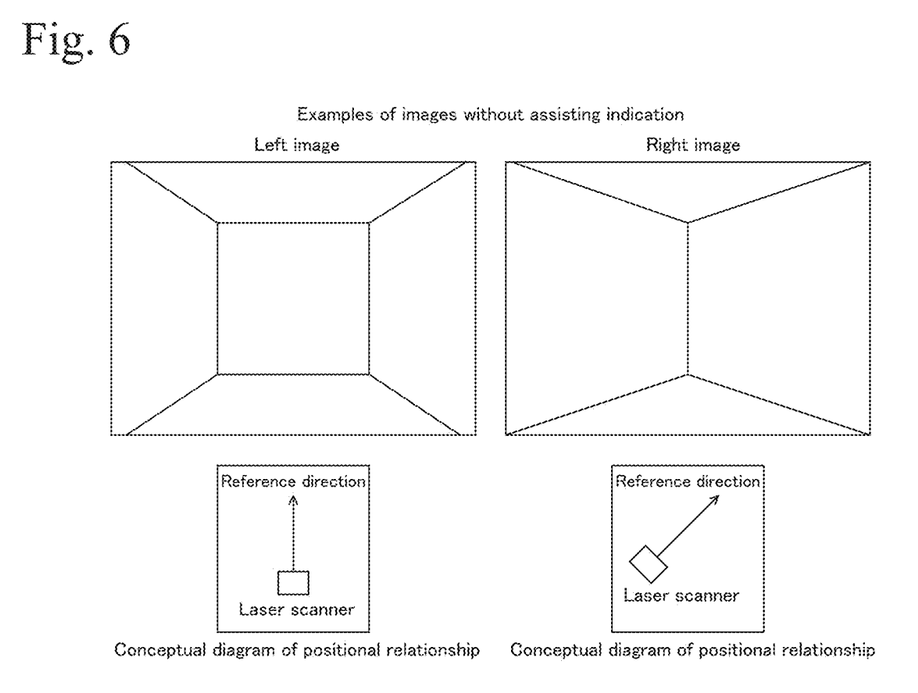
FIG. 6 is an image showing examples of displayed panoramic images.
Figure 7:
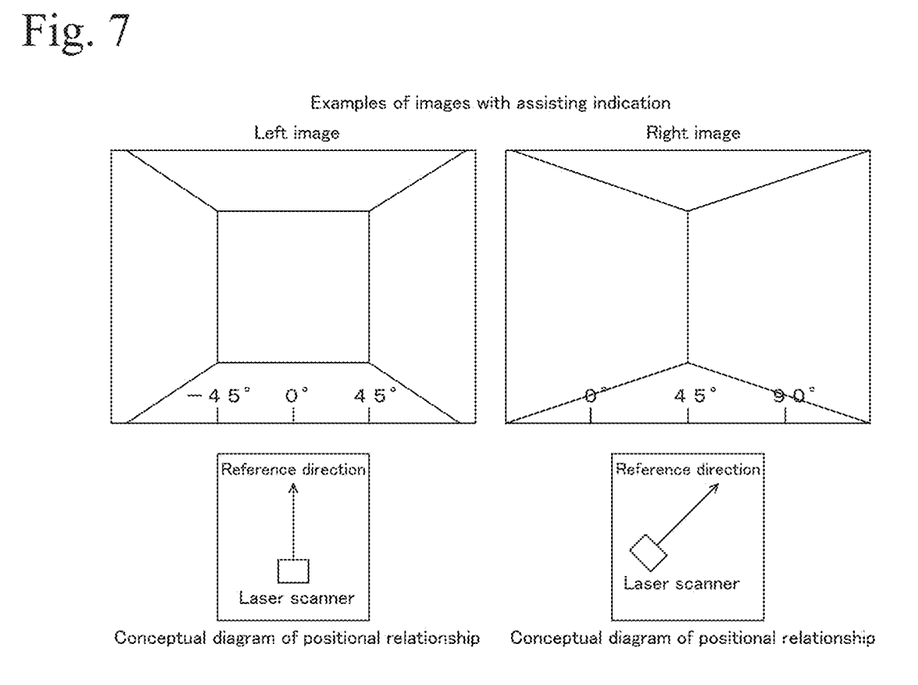
FIG. 7 is an image showing examples of displayed panoramic images.

FIG. 6 shows displayed images without an assisting indication, whereas FIG. 7 shows displayed images with an assisting indication. These examples of the images are displayed on a display such as of a PC constituting the survey data processing device 300.

FIGS. 6 and 7 show examples of a case of simultaneously displaying two panoramic images on right and left in a separate manner, which are obtained at two different instrument points. The displayed images shown in FIGS. 6 and 7 are panoramic images that are obtained by placing the laser scanner 100 in a square room. Although an actual panoramic image contains distortion, FIGS. 6 and 7 show examples of panoramic images with a narrowed angle of view and with inconspicuous distortion to facilitate understanding.

Positional relationship conceptual diagrams are shown under the images, although they are not being displayed in actual cases. These positional relationship conceptual diagrams show positional relationships between the room to be measured and the laser scanner 100, which are not accurately determined at this stage.

A simple object is exemplified in the drawings, nevertheless, in the case of the image display in FIG. 7, it is still difficult to exactly determine the correspondence relationship between the first panoramic image on a left screen and the second panoramic image on a right screen.

FIG. 7 shows an example of a case of displaying an assisting indication in the image on the right screen. In this case, the image on the right screen and the image on the left screen are displayed by aligning the azimuths of the images on the right and left screens on the basis of the azimuth information of the laser scanner 100 at each of the instrument points. The azimuth information is shown in each of the displayed images. The control of displaying the assisting indication is performed by the assisting indication controlling section 310.

In this example, the reference direction of the first panoramic image and the reference direction of the second panoramic image differ from each other by 45 degrees. In consideration of this, an indication of the azimuth of the second panoramic image on the right is shifted by minus 45 degrees to make the indications of the azimuths and the photographed objects in the two panoramic images agree with each other. Thus, the azimuths of the panoramic images on the right and left shown in FIG. 7 are made to approximately agree with each other. Due to different points of view or different instrument points of the panoramic images on the right and left, the displayed panoramic images differ from each other as shown in FIG. 7 even though the azimuths are aligned.

However, the displayed images are panoramic images in which the azimuths are aligned, and thus, a part that is the same or similar between the panoramic images on the right and left is easily found. An operator looks at the separately displayed images as shown in FIG. 7 to find a part that is the same or similar between the panoramic images on the right and left and then designate the same or similar part by using a GUI. The designated information is received by the similar part designation receiving unit 303.

The display controlling unit 309 also controls displaying of a reflection intensity image, a distance image, and a normal vector image, which are described later. The communicating unit 311 allows communication between the survey data processing device 300 and the outside.

The panoramic image-and-point cloud data integrating unit 312 integrates the panoramic image and the point cloud data. The integration of the panoramic image and the point cloud data enables obtaining three-dimensional coordinates of any point in the panoramic image from the point cloud data. In this embodiment, a case of obtaining a composite image by compositing the panoramic image and the point cloud image is described as an example of processing of the integration. The point cloud image is an image of visualized respective points of point cloud data as viewed from a point of view or the origin of laser scanning. The point cloud image shows each scanning point as a point and shows an image of an object by a set of the points.

The following describes a method of generating a composite image by compositing a panoramic image and a point cloud image. In this processing, first, a directional line is obtained by connecting a projection center or an optical origin of a panoramic image and each point of a point cloud obtained by laser scanning. The positional relationship between the projection center of the camera for obtaining the panoramic image and the optical origin of the laser scanning is known. Thus, the positional relationship between a projection center O of the panoramic image and each point Pn of the point cloud obtained by laser scanning is determined by calculation. In the condition in which the positional relationship between the points O and Pn is obtained, a directional line connecting the points O and Pn is calculated.

After the directional line with respect to each point of the point cloud, which is obtained by laser scanning, is acquired, the each point of the point cloud is projected to an intersection point of a projected plane of the panoramic image and the directional line to be displayed as a point in the projected plane. This provides a point cloud image showing the point cloud, which is obtained by laser scanning, as points. This point cloud image is a panoramic image as viewed from the same point of view as the corresponding panoramic image. Data of both images are integrated, thereby obtaining a composite image of the panoramic image and the point cloud image that are composited.

For the composite image, the panoramic image and the point cloud image can be displayed on a display at the same time or either one of the panoramic image and the point cloud image can be displayed on a display. The display may be a display unit such as of a PC used as the survey data processing device 300. An example of the display unit includes a liquid crystal display.

The three-dimensional model generating unit 313 generates a three-dimensional model of the laser-scanned object on the basis of the point cloud data obtained by laser scanning Specifically, lines and planes are extracted from the point cloud data, and data of outlines of the measured object is obtained. This technique is disclosed in, for example, WO2011/070927 and Japanese Unexamined Patent Applications Laid-Open Nos. 2012-230594 and 2014-35702.

The plane or line azimuth calculator 314 calculates an azimuth of a line or a plane constructing the three-dimensional model. The plane refers to a vertical plane, and the azimuth of the plane is in a horizontal direction, i.e., in directions of north, south, east, and west of a normal vector of the plane. The line refers to a straight line extending in the horizontal direction, and the azimuth of the line is in the extending direction.

The same part extracting unit 315 extracts one or both of a plane and a line that are the same or similar between a first three-dimensional model and a second three-dimensional model. The first three-dimensional model is a three-dimensional model based on first point cloud data obtained at a first instrument point. The second three-dimensional model is a three-dimensional model based on second point cloud data obtained at a second instrument point.

The common line is extracted by determining whether two target lines have a difference in azimuth and a difference in length that are predetermined thresholds or less. The length of the line is calculated as a distance between both end points of the point cloud constituting the line.

The common plane is extracted by determining whether target two planes have a difference in the azimuth of the normal line of the plane and a difference in the area of the plane, that are predetermined thresholds or less. The area of the plane is obtained by calculating an area of points constituting the plane. The plane refers to a vertical plane.

The point cloud data merging unit 316 merges the first point cloud data and the second point cloud data that are obtained at different instrument points. Specifically, one or both of the two pieces of point cloud data are subjected to coordinate conversion in order to use the two pieces of point cloud data in the same coordinate system. In the case of obtaining the first point cloud data by the laser scanner 100 and obtaining the second point cloud data by the laser scanner 100', a relationship between one common point and an azimuth is determined or two or more common points are designated, thereby enabling merging of the two pieces of point cloud data.

Example of Processing

Figure 8:
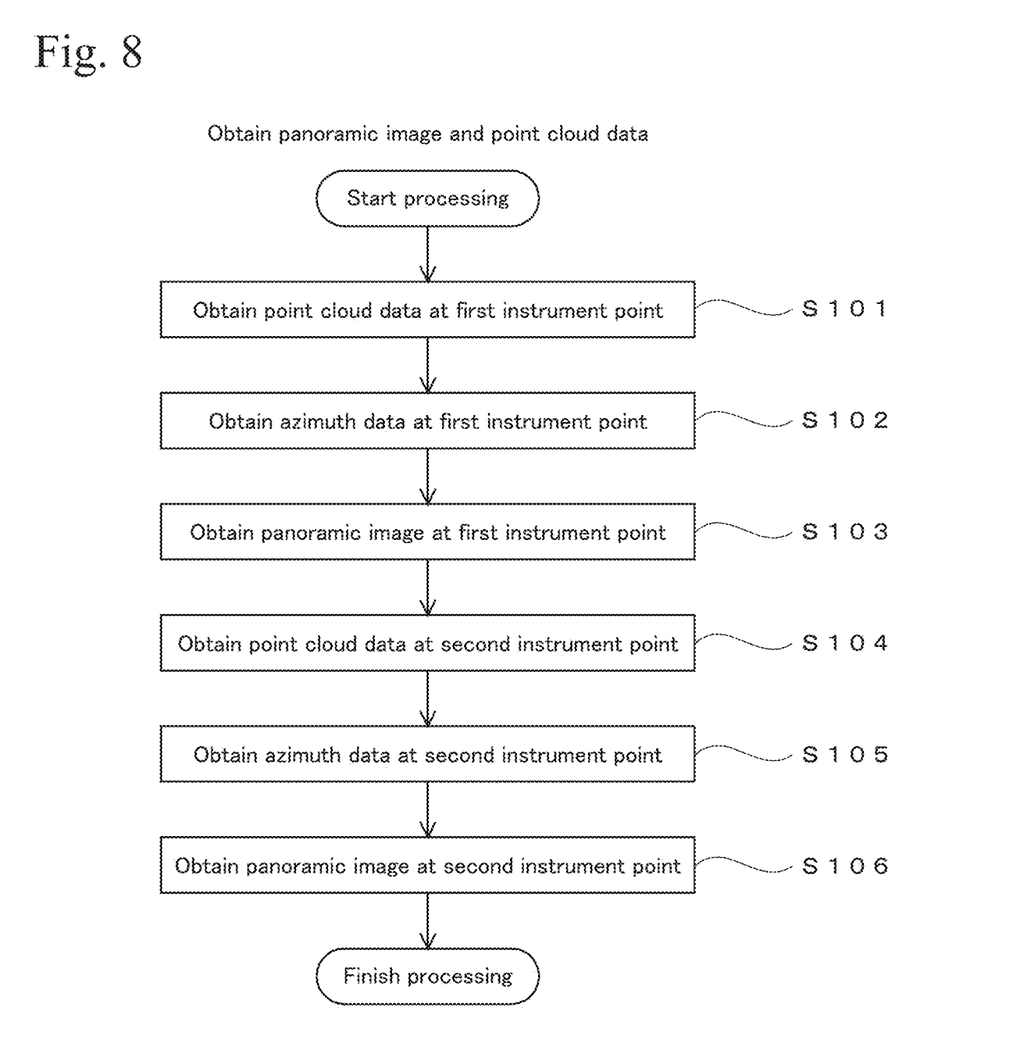
FIG. 8 is a flowchart showing an example of a processing procedure.

The following describes an example of processing relating to the survey data processing device 300. First, point cloud data and panoramic image data are obtained at two different instrument points. FIG. 8 shows a flow at that time. First, after the laser scanner 100 is placed at a first instrument point, point cloud data surrounding the laser scanner 100 is obtained (step S101), azimuth data is obtained (step S102), and a panoramic image is obtained (step S103).

The point cloud data and the panoramic image are obtained by performing laser scanning around 360 degrees, but the laser scanning can be performed by narrowing down the angle range. This also applies to the measurement at a second instrument point. It is necessary to overlap an object to be measured at the first instrument point and an object to be measured at the second instrument point. The object to be measured is a target from which point cloud data and a panoramic image are obtained.

Next, after the laser scanner 100' is placed at the second instrument point, point cloud data surrounding the laser scanner 100' is obtained (step S104), azimuth data is obtained (step S105), and a panoramic image is obtained (step S106). The laser scanner that is used at the first instrument point and the laser scanner that is used at the second instrument point can be separate devices.

Figure 9:
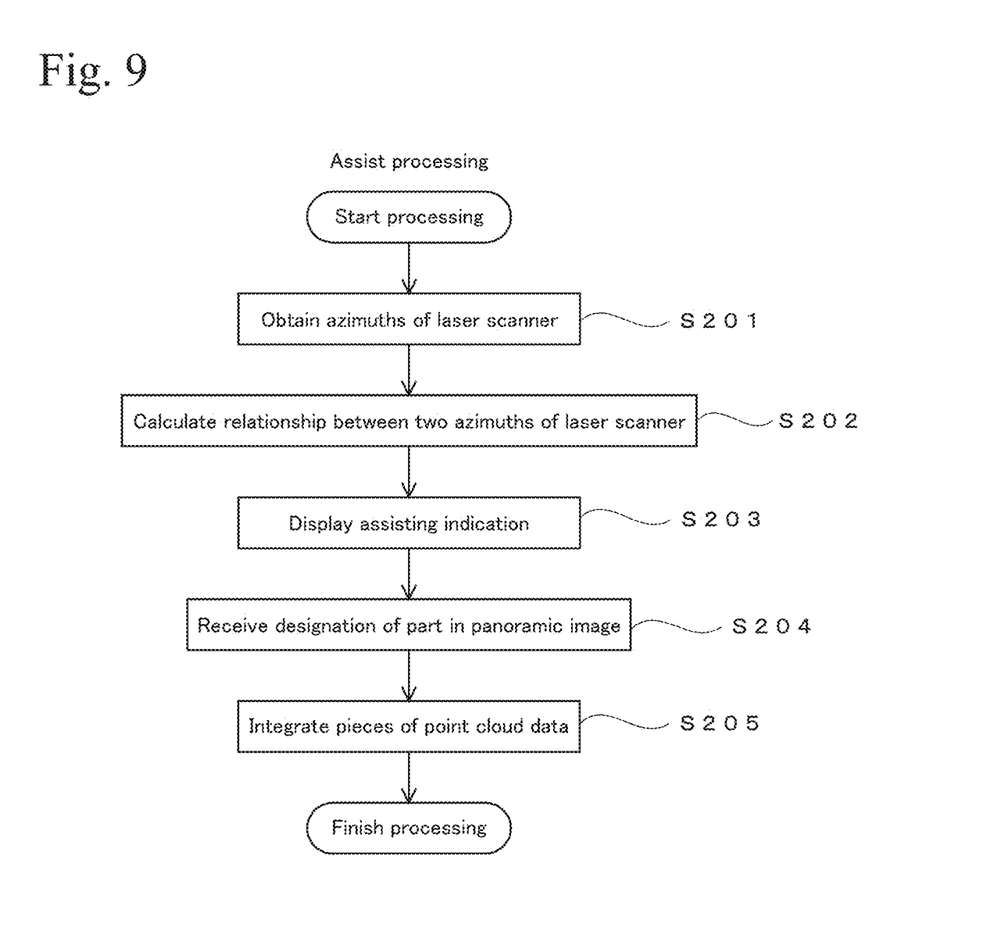
FIG. 9 is a flowchart showing an example of a processing procedure.

After the point cloud data and the panoramic image are obtained at the first instrument point, and the point cloud data and the panoramic image are obtained at the second instrument point, the processing in FIG. 9 is performed. The processing in FIG. 9 is performed by the survey data processing device 300. A program for executing the processing in FIG. 9 is stored in an appropriate storage region in the survey data processing device 300. This program may be stored in a server or a storage medium and be used by downloading it therefrom.

First, azimuths of the laser scanner 100 at the first instrument point and the second instrument point are obtained (step S201). Next, on the basis of the azimuth information of the laser scanner 100 at each instrument point obtained in step S201, a relationship of azimuth of the laser scanner 100 between at the first instrument point and at the second instrument point is calculated (step S202). This process is performed by the angle relationship calculator 306. This process provides a difference or a deviation in an initial value of azimuth or in a reference azimuth of the laser scanner 100 between at the first instrument point and at the second instrument point.

After the relationship of the reference azimuth between the two instrument points is obtained, an assisting indication is displayed (step S203). In this case, the two panoramic images are displayed side by side on right and left sides at the same time. Displaying the assisting indication in this state provides the displayed image as shown in FIG. 7, for example. After the assisting indication is displayed, designation of a part in the panoramic image is received (step S204).

At this time, as shown by the example in FIG. 7, the azimuths of the panoramic images are displayed on the displayed images. This facilitates visual understanding of the relationship between corresponding parts of the two panoramic images, thereby enabling easy designation of parts corresponding between the two panoramic images. After designation of corresponding parts is received, the two pieces of point cloud data are merged on the basis of the designated corresponding parts (step S205).

Example of Displayed Images

Figure 10:
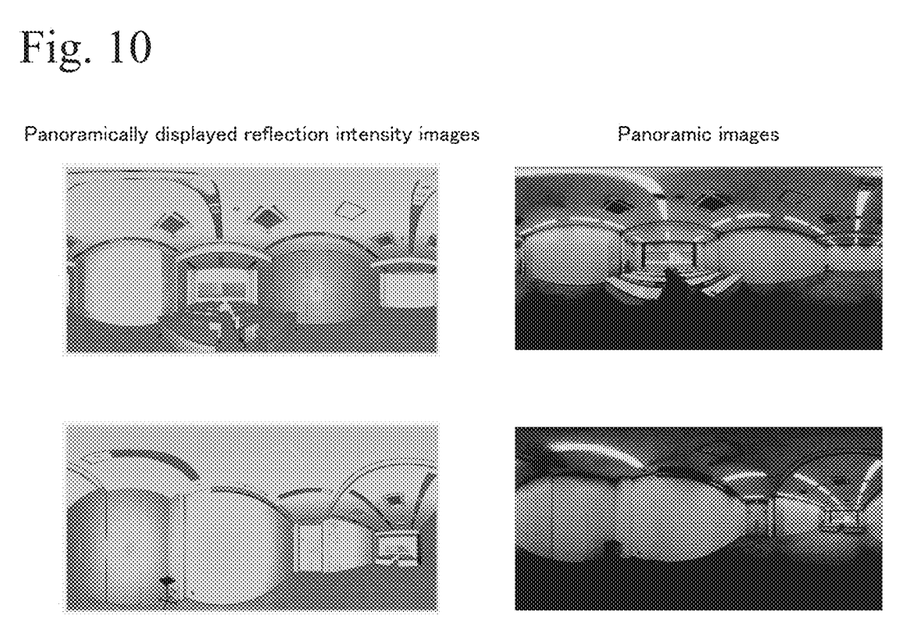
FIG. 10 shows reflection intensity images and panoramic images.

The following describes examples of the first panoramic image and the second panoramic image displayed on a display, which correspond to FIG. 6. FIG. 10 shows panoramically displayed reflection intensity images. The reflection intensity image is an image with colors that are set in accordance with reflection intensity of distance measuring light that is reflected back from each point of the point cloud. Note that, in the drawing of this embodiment, the image has a gray scale corresponding to the reflection intensity. FIG. 10 shows a first reflection intensity image and a second reflection intensity image on upper and lower left sides and shows a first panoramic image and a second panoramic image on upper and lower right sides.

Figure 11:
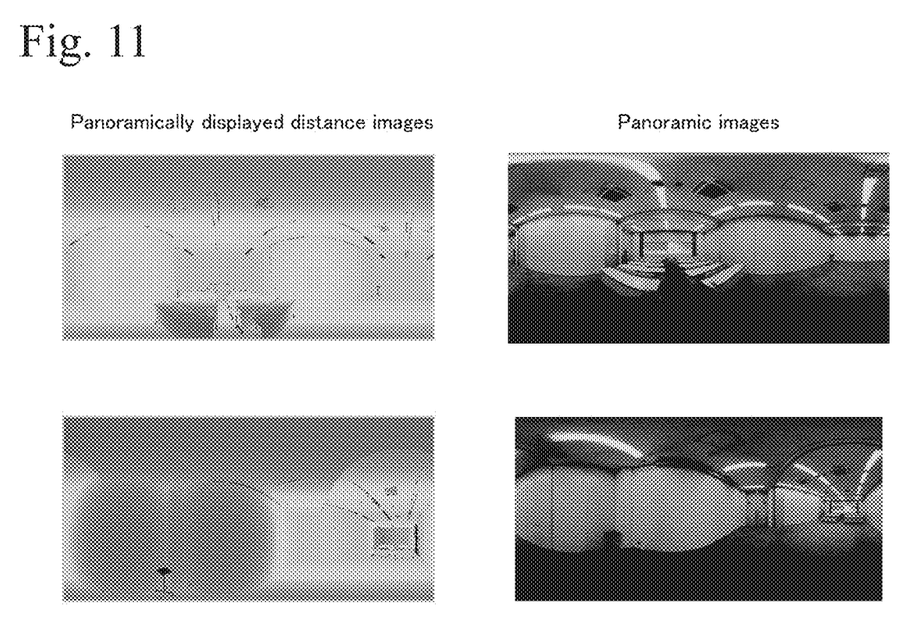
FIG. 11 shows distance images and panoramic images.

FIG. 11 shows panoramically displayed distance images. The distance image is an image with colors that are set in accordance with distances from the laser scanner to the reflection points. Note that, in the drawing of this embodiment, the image has a gray scale corresponding to the distances. FIG. 11 shows a first distance image and a second distance image on upper and lower left sides and shows a first panoramic image and a second panoramic image on upper and lower right sides.

Figure 12:
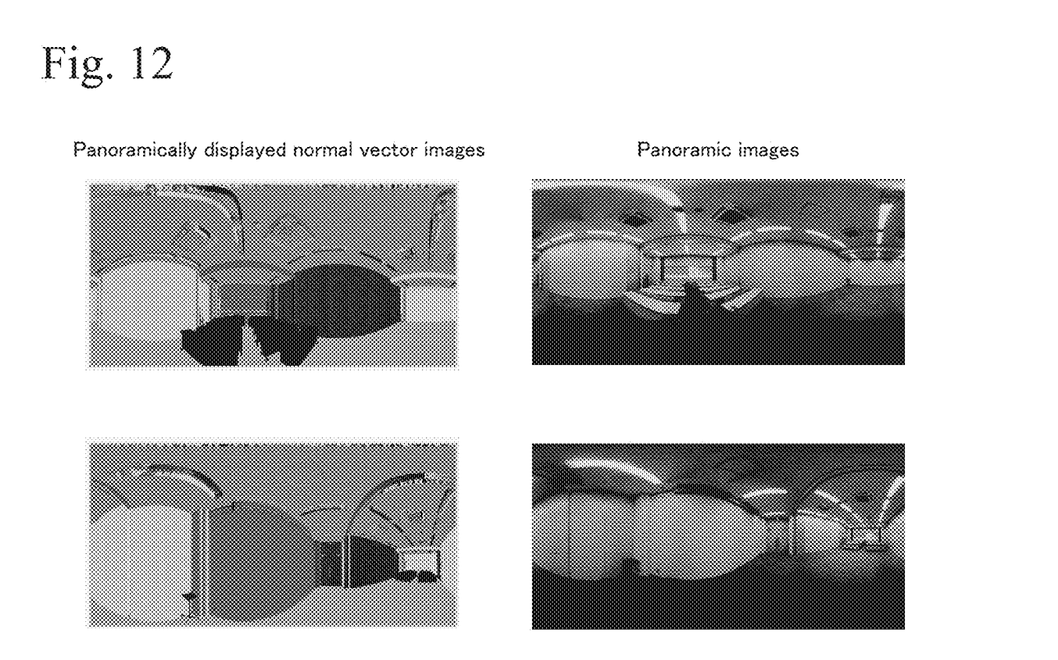
FIG. 12 shows normal vector images and panoramic images.

FIG. 12 shows panoramically displayed normal vector images. The normal vector image is an image with colors that are set to reflect a difference in direction between normal lines of planes. Note that, in the drawing of this embodiment, the image has a gray scale corresponding to the difference in direction between normal lines of planes. FIG. 12 shows a first normal vector image and a second normal vector image on upper and lower left sides and shows a first panoramic image and a second panoramic image on upper and lower right sides.

Other Examples

The following describes other examples of the assisting indication. In these examples, a plane or line azimuth is calculated with respect to a normal vector image as shown in FIG. 12, and a plane or a line that is in the same azimuth between a first panoramic image and a second panoramic image is highlighted in each of the first panoramic image and the second panoramic image.

The case of using a plane is described hereinafter. In this example, a vertical plane is used as a target plane. First, a first panoramic image and a first point cloud image that are obtained at a first instrument point are acquired, and further, a first composite image generated by compositing the first panoramic image and the first point cloud image is acquired. Similarly, a second panoramic image and a second point cloud image that are obtained at a second instrument point are acquired, and further, a second composite image generated by compositing the second panoramic image and the second point cloud image is acquired. Moreover, a reference azimuth of the laser scanner 100 at the first instrument point and a reference azimuth of the laser scanner 100' at the second instrument point are obtained as a first reference azimuth and a second reference azimuth, respectively. The reference azimuth is based on an azimuth of an optical axis of the laser scanner at the start of laser scanning.

Next, a three-dimensional model based on first point cloud data and a three-dimensional model based on second point cloud data are respectively generated as a first three-dimensional model and a second three-dimensional model by the three-dimensional model generating unit 313. Thereafter, a vertical plane is extracted from the first three-dimensional model. The number of the extracted vertical planes is increased as much as possible. In a case of measuring an interior of a room, normally, multiple vertical planes are extracted.

The laser scanner 100 is placed horizontally, and thus, the obtained first reference azimuth enables determination of an absolute azimuth of each point of the point cloud data from the first instrument point. As a result, the direction of the three-dimensional model based on the point cloud data is determined, and the azimuth of a normal line of the vertical plane is calculated. With this principle, azimuths of normal lines of the multiple vertical planes extracted from the first three-dimensional model are calculated. In addition, an area of each of the vertical planes is calculated.

Similarly, vertical planes are extracted from the second three-dimensional model, and an azimuth of a normal line of each of the vertical planes is calculated. In addition, an area of each of the vertical planes is calculated.

In these conditions, the planes extracted from the first three-dimensional model and the planes extracted from the second three-dimensional model are compared with each other to extract a pair of the planes in which the azimuths of the normal lines and the areas can be considered as agreeing with each other. In the case of using a line, lines extracted from the first three-dimensional model and lines extracted from the second three-dimensional model are compared with each other to extract a pair of lines in which the extending directions and the lengths can be considered as agreeing with each other. This processing is performed by the same part extracting unit 315.

Thereafter, one pair of the planes in which the azimuths of the normal lines and the areas can be considered as agreeing with each other is used as a plane that is the same between the two three-dimensional models, and the paired planes are highlighted, for example, in the displayed images in FIG. 6 or 7. Examples of the method of highlighting include a method of displaying the paired planes by the same color and a method of displaying the paired planes in a manner blinking synchronously at the same timing. Alternatively or additionally, one pair of the extracted lines that can be considered as being the same line between the two three-dimensional models is highlighted, for example, in the displayed images in FIG. 6 or 7. The method of highlighting is the same as in the case of using a plane. The control relating to highlighting is performed by the assisting indication controlling section 310.

Determining planes as being the same plane can also be performed by using only one of the azimuth of a normal line and the area of the plane. In addition, determining lines as being the same line can also be performed by using only one of the extending direction of the line and the length of the line.

Example of Case not Using Camera

Instead of using a photographed image taken by the camera as a panoramic image, a panoramic image that is generated by imaging point cloud data obtained by the laser scanner can also be used. Examples of imaged point cloud data include a point cloud image, a reflection intensity image, a distance image, and a normal vector image.

The point cloud image is an image constituted of points of point cloud data that are projected on a projection plane. An RGB image is a point cloud image showing information of color intensities of reflection points by points. The reflection intensity image is an image with colors that are set in accordance with reflection intensity of distance measuring light that is reflected back from each point of the point cloud. The distance image is an image with colors that are set in accordance with distances from the laser scanner to the reflection points. The normal vector image is an image with colors that are set to reflect a difference in direction between normal lines of planes.

In the case of using pieces of point cloud data that are panoramically imaged, as panoramic images, a camera is not necessary. Thus, a laser scanner without a camera can be used. Alternatively, the present invention can be implemented without using a photographed image taken by a camera provided to a laser scanner. In the case of using a panoramic image based on an image constituted of point clouds, such as a point cloud image, a device for obtaining a panoramic image and a device for performing laser scanning can be the same device. Of course, in the case in which the device for obtaining a panoramic image and the laser scanner are the same device, the relationship of the exterior orientation parameters between the device and the laser scanner is known.

For an image based on point cloud data such as a point cloud image, an RGB image described below, a reflection intensity image, a distance image, and a normal vector image, a horizontal angle, a vertical angle, and a distance are recorded as information of each pixel. Thus, it is possible to extract XYZ coordinates of a specific point immediately at the time a user clicks the specific point in an image.

Example of Case Using RGB Image

A panoramically imaged RGB image can also be used as a panoramic image. The RGB image is a point cloud image added with color information that is obtained from a photographed image taken by a camera.

The present invention can be used in a technique for matching pieces of point cloud data obtained at different instrument points.

What is claimed is:

1. A survey data processing device comprising a processor or circuitry, the processor or circuitry configured to:
  receive image data of a first panoramic image obtained at a first point of view and image data of a second panoramic image obtained at a second point of view;
  receive first point cloud data and second point cloud data, the first point cloud data being obtained by a first laser scanner in which a positional relationship and an attitude relationship relative to a first device for obtaining the first panoramic image are known, and the second point cloud data being obtained by a second laser scanner in which a positional relationship and an attitude relationship relative to a second device for obtaining the second panoramic image are known;
  receive designation of the same or a similar part that is the same or similar between the first panoramic image and the second panoramic image;
  determine a correspondence relationship between the first point cloud data and the second point cloud data on a basis of the first point cloud data corresponding to the same or similar part and the second point cloud data corresponding to the same or similar part; and
  in a case in which a specific part is designated in the first panoramic image, display an assisting indication showing a horizontal angle position at the specific part in the second panoramic image, on a basis of an azimuth in a horizontal direction of the first device at the time of obtaining the first panoramic image and an azimuth in a horizontal direction of the second device at the time of obtaining the second panoramic image.

2. The survey data processing device according to claim 1, wherein at least two points are designated as the same or similar parts.

3. The survey data processing device according to claim 1, wherein at least one point is designated as the same or similar part, and the correspondence relationship between the first point cloud data and the second point cloud data is determined on a basis of coordinates of the at least one point of the first point cloud data, coordinates of the at least one point of the second point cloud data, direction of the first device at the time of obtaining the first panoramic image, and direction of the second device at the time of obtaining the second panoramic image.

4. The survey data processing device according to claim 3, wherein the direction of the first device is the azimuth in the horizontal direction of the first device, and the direction of the second device is the azimuth in the horizontal direction of the second device.

5. The survey data processing device according to claim 1, wherein the assisting indication shows an angle of a horizontal azimuth.

6. The survey data processing device according to claim 1, wherein the horizontal azimuths of the first panoramic image and the second panoramic image are aligned to display the assisting indication.

7. The survey data processing device according to claim 1, wherein the same or similar part is a line segment or a plane.

8. A survey data processing device comprising a processor or circuitry, the processor or circuitry configured to:
  receive image data of a first panoramic image obtained at a first point of view and image data of a second panoramic image obtained at a second point of view;
  receive first point cloud data and second point cloud data, the first point cloud data being obtained by a first laser scanner in which a positional relationship and an attitude relationship relative to a first device for obtaining the first panoramic image are known, and the second point cloud data being obtained by a second laser scanner in which a positional relationship and an attitude relationship relative to a second device for obtaining the second panoramic image are known;
  receive designation of the same or a similar part that is the same or similar between the first panoramic image and the second panoramic image;
  determine a correspondence relationship between the first point cloud data and the second point cloud data on a basis of the first point cloud data corresponding to the same or similar part and the second point cloud data corresponding to the same or similar part;
  generate a first three-dimensional model based on the first point cloud data and a second three-dimensional model based on the second point cloud data;
  extract a second line that constitutes the second three-dimensional model and that corresponds to a first line constituting the first three-dimensional model; and
  highlight the first line and the second line.

9. A survey data processing device comprising a processor or circuitry, the processor or circuitry configured to:
  receive image data of a first panoramic image obtained at a first point of view and image data of a second panoramic image obtained at a second point of view;
  receive first point cloud data and second point cloud data, the first point cloud data being obtained by a first laser scanner in which a positional relationship and an attitude relationship relative to a first device for obtaining the first panoramic image are known, and the second point cloud data being obtained by a second laser scanner in which a positional relationship and an attitude relationship relative to a second device for obtaining the second panoramic image are known;
  receive designation of the same or a similar part that is the same or similar between the first panoramic image and the second panoramic image; and
  determine a correspondence relationship between the first point cloud data and the second point cloud data on a basis of the first point cloud data corresponding to the same or similar part and the second point cloud data corresponding to the same or similar part;
  generate a first three-dimensional model based on the first point cloud data and a second three-dimensional model based on the second point cloud data;
  extract a second plane that constitutes the second three-dimensional model and that corresponds to a first plane constituting the first three-dimensional model; and
  highlight the first plane and the second plane.

* * * * *